July 6, 1943.   C. YEOMANS ET AL   2,323,437
SEWAGE TREATMENT APPARATUS
Filed July 31, 1939   6 Sheets-Sheet 1

Inventors:
Charles Yeomans and
Harold T. Jeffery,
By Fisher, Clapp, Soans & Pond
Attorneys.

July 6, 1943.  C. YEOMANS ET AL  2,323,437
SEWAGE TREATMENT APPARATUS
Filed July 31, 1939  6 Sheets-Sheet 4

July 6, 1943. C. YEOMANS ET AL 2,323,437

SEWAGE TREATMENT APPARATUS

Filed July 31, 1939 6 Sheets-Sheet 6

Inventors:
Charles Yeomans and
Harold T. Jeffery,
By Fisher, Clapp, Soans & Pond
Attorneys.

Patented July 6, 1943

2,323,437

UNITED STATES PATENT OFFICE 2,323,437

SEWAGE TREATMENT APPARATUS

Charles Yeomans, Hubbard Woods, and Harold T. Jeffery, Chicago, Ill., assignors to Yeomans Brothers Company, Chicago, Ill., a corporation of Delaware Application July 31, 1939, Serial No. 287,538

9 Claims. (Cl. 210—8)

Our invention relates generally to apparatus for use in the treatment of sewage, and particularly to apparatus for the treatment of liquid sewage by the use of activated sludge.

One of the most important objects of our invention is to provide improved apparatus for separating sludge or other solid materials from liquid sewage or the like, and particularly to provide apparatus for continuously separating sludge from the liquid portion of the sewage during sewage treatment operations. A second important object of our invention consists in the provision of improved, combination aeration and settling tanks for use in the treatment of liquid sewage.

Another object of our invention is to provide certain improved auxiliary apparatus which may be embodied into existing or new sewage treatment equipment for the purpose of adapting such equipment for operation in accordance with the above expressed principal objects of the invention. The foregoing objects and the various novel features and advantages of our invention will become more apparent by reference to the accompanying drawings and the following description of certain preferred embodiments thereof. In the drawings—

Figure 1:
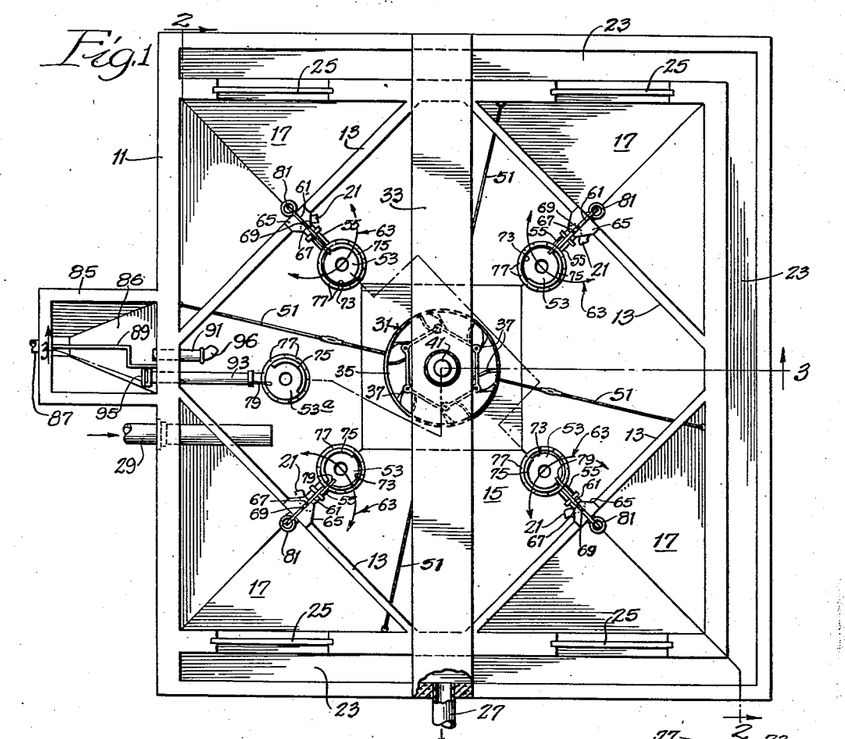
Figure 1 is a plan view of a rectangularly shaped, combination sewage aeration and settling tank constructed in accordance with our invention.
Figure 2:
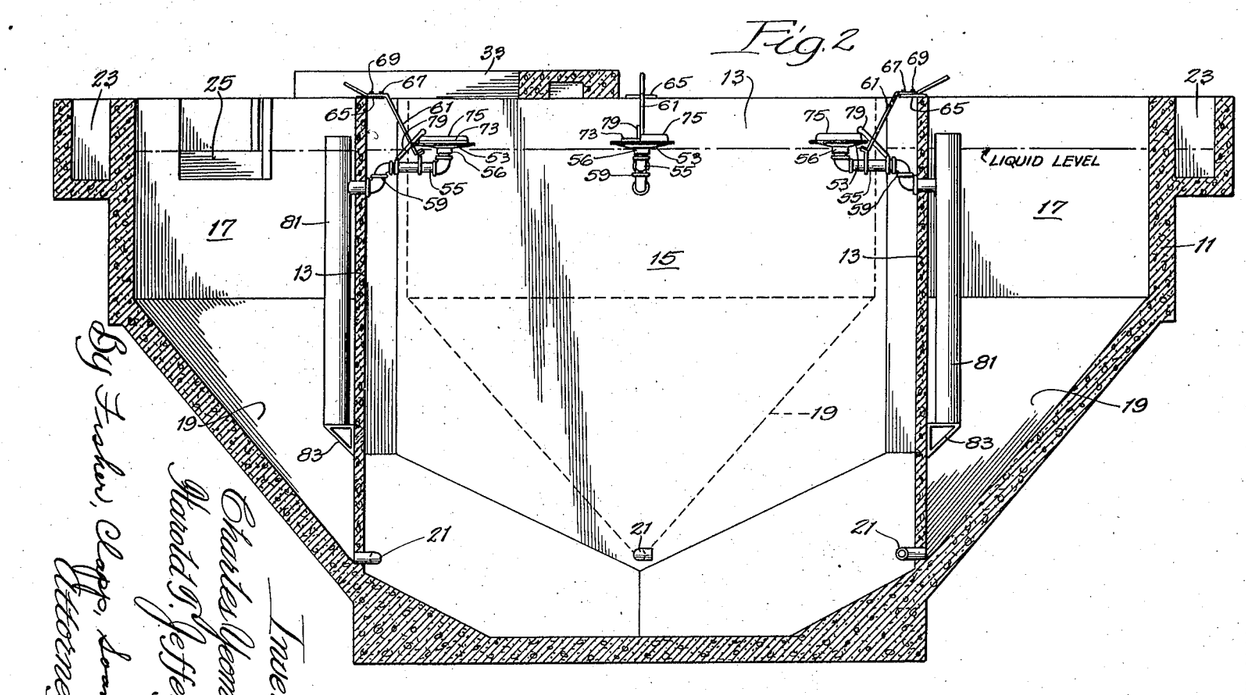
Figures 2 and 3 are sectional views taken respectively on the lines 2—2 and 3—3 of Figure 1.
Figure 3:
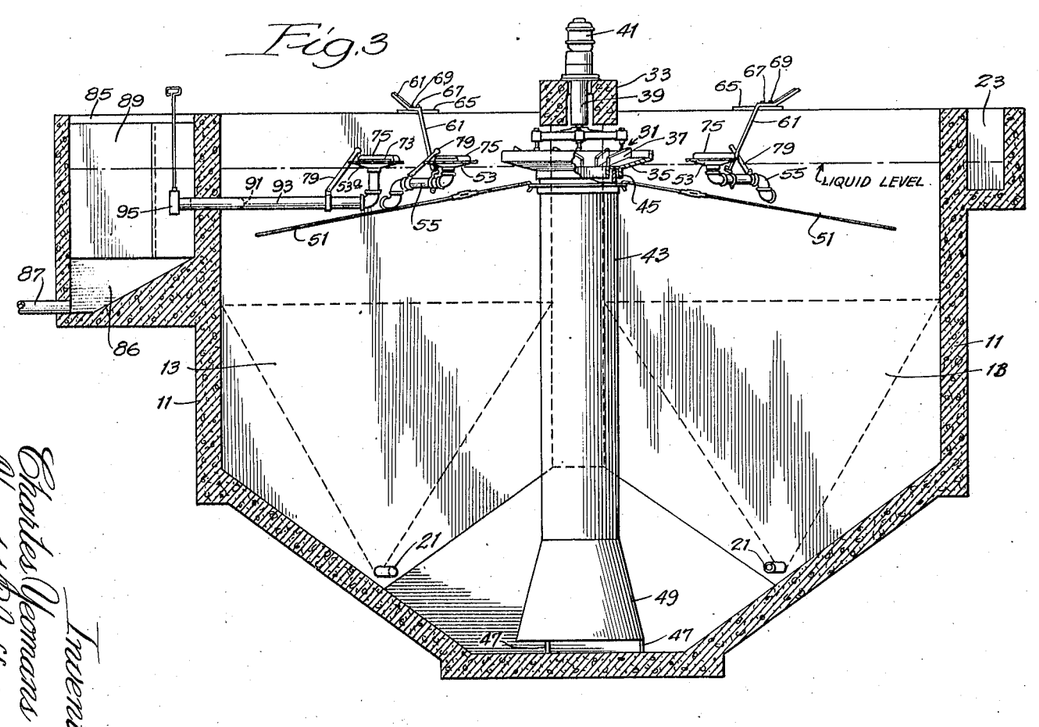

In certain respects the apparatus illustrated in Figures 1, 2, and 3 of the drawings is an improvement on the combination sewage aeration and settling tank apparatus disclosed in United States Letters Patent No. 1,497,425 to Ames et al. In the structure disclosed in the Ames patent, a rectangular sewage tank is provided for containing the liquid sewage which is to be treated. This tank is provided with four, vertically arranged, rectangularly shaped, corner baffles which divide the tank into a central compartment which is utilized as an aeration tank and four triangularly shaped corner compartments which are used as settling tanks. During the operation of the Ames apparatus, the intermixed sludge and sewage liquor to be treated are continuously drawn from the bottom of the central aeration tank and scattered over the surface of the aeration tank with a combined wave and spray action, which effectively aerates the mixture, through the operation of a conically shaped rotary aerator, the liquid being conducted to the aerator by means of a suitable updraft pipe disposed centrally of the aeration tank. The baffles which define the triangularly shaped settling compartments in the corners of the main tank terminate some distance from the bottom of the tank, and during the operation of the Ames apparatus, it is intended that the untreated sewage which continuously flows into the apparatus shall cause a gradual outflow of purified supernatant liquor, or effluent as such liquor is usually designated in the art, from the settling tanks to the effluent discharge. To facilitate the return to the aeration tank of the sludge which settles out in the settling tanks, Ames urges that the bottom of the main tank shall slope in all directions toward the center thereof and shall be devoid of sharp angles which might entrap sludge and cause it to become septic. It should be noted that in the Ames apparatus the direction of flow of the effluent is supposed to be upwardly from the bottom of each of the settling chambers.

A large number of sewage disposal systems constructed in accordance with the teachings of this Ames patent have been installed both in this country and abroad, and while some of the systems have operated reasonably satisfactorily, considerable difficulty has been experienced in obtaining a clear effluent due to the presence of suspended sludge in the effluent, and it is with the overcoming of this difficulty that the present invention is particularly concerned.

Reduced to its simplest elements, the present invention accomplishes its desired result by introducing the intermixed sludge and sewage liquor which are to be separated into the top of the separating tank under sufficient pressure to cause the main direction of flow within the settling tank to be not upwardly as in the Ames apparatus but downwardly. This principle makes possible the substantial closing off of the bottom of the settling compartments, and under actual working conditions, the principle has fully proven its utility. While particularly applicable to sewage treatment apparatus which combine the aeration and settling tanks in one structure, the principle of operation of our invention may be used in other types of apparatus and probably for the accomplishment of the separation of other materials than intermixed or suspended sludge.

Referring particularly to Figures 1, 2, and 3 of the drawings, a rectangular main tank, which may be of reinforced concrete or other suitable construction, is illustrated at 11. An integrally formed baffle 13 extends across each of the corners of the main tank 11 and serves to divide that tank into a rectangularly shaped central compartment 15 which is used as the aeration tank, and four triangularly shaped, separate corner compartments 17, which serve as the settling tanks. The lower portion 19 of each of the settling compartments 15 is in the form of a triangular pyramid as illustrated particularly in Figure 2, and each of the settling compartments 17 communicates with the aeration compartment 15 through an elbow pipe section 21 which is located at the apex of this pyramidal portion 19 and which is preferably turned in the direction of normal rotative movement of the sewage within the aeration compartment 15. By virtue of this form, the bottom walls of each of the settling compartments 17 slope in all directions toward the inlet end of the communicating pipes 21, and any sludge or other solid material which settles out in the compartments 17 can be readily conveyed into the central aeration compartment 15 without any possibility of sludge accumulating within the settling compartments themselves. The angle of slope of the side walls of the settling compartment 17 in the pyramidal portion 19 should not be less than about 45° and usually will be within the range of from 45° to 60°.

To permit convenient removal of the purified effluent from the settling compartments 17, a suitable channel 23 is formed integrally with the walls of the main tank 11, and each of the settling compartments communicates with this channel through an adjustable weir 25 as illustrated particularly in Figures 1 and 2. The channel 23 connects directly with the effluent outflow line 27 as illustrated in Figure 1.

The raw sewage may be fed into the aeration compartment 15 by any suitable means such as the inlet pipe 29 illustrated in Figure 1. Ordinarily the raw sewage will be continuously fed into the apparatus at a rate which is sufficiently low to assume complete purification during the retention period. During the operation of the apparatus, the intermixed sewage and sludge within the aeration compartment is continuously aerated by means of a power driven rotary agitator 31 which preferably is generally similar to that disclosed in United States Letters Patent No. 1,497,425 to Ames et al., which has been previously referred to. This agitator and the operating means therefor are supported upon a suitable longitudinal beam support 33 which extends across the top of the main tank 11. The main element of the agitator is a saucer-like cone-shaped disperser 35 which is open at its center and which is provided with specially shaped vanes 37. The disperser 35 is suspended from a vertical shaft 39 and is rotated by a motor 41 or other suitable means. The central opening in the conical disperser 35 is located concentric with, and is of substantially the same diameter as, the upper end of a relatively large diameter uptake pipe 43 which is located centrally of the aeration compartment 15 for facilitating the circulation of the intermixed liquor and sludge contained therein. A labyrinth seal 45 (Figure 3) minimizes leakage at the outlet end of the updraft pipe 43. The intake or lower end of the updraft pipe 43 is raised some distance above the bottom of the aeration compartment by means of brackets 47, and is preferably flared as illustrated at 49 in Figure 3 to facilitate inflow of the liquor contained in the aeration compartment 15. Adjustable guys 51 may be provided to steady the updraft pipe 43, and the bottom of the aeration compartment 15 should slope toward the center thereof.

The outer edge of the aerator disperser 35 should be positioned at about the same elevation as the liquid level in the aeration compartment 15, and when the aerator is in operation, the mixture or suspension of sewage liquor and sludge will be discharged or scattered with a combined wave and spray action over most of the surface of the aeration tank. The rate of fluid discharge from the aeration cone or disperser 35 should be sufficiently high that the entire contents of the aeration compartment 15 will be circulated through the aerator once in approximately fifteen to twenty minutes.

As pointed out previously, during the operation of the apparatus of our invention a continuous circulatory flow of liquid is maintained downwardly through each of the settling compartments 17 for the purpose of returning settled sludge to the aeration compartment 15 through the openings provided by the piping 21. In order to effect this downward flow, the apparatus of our invention includes means for continuously conducting liquid from the aeration compartment 15 into the settling compartments 17 under such conditions that the pressure head of the liquid so conducted shall be substantially increased with respect to the main body of liquor in the aeration compartment 15. Specifically, the apparatus is provided with four funnel members 53 which are so positioned that they will collect substantial amounts of the intermixed liquid and sludge which is scattered over the surface of the aeration tank by the rotating aerator cone 35. The outlet end of each of these funnels 53 is connected to one of the settling compartments 17 by suitable piping 55, and the inlet end of each of the funnels 53 is located above the liquid level in the aeration compartment 15. Hence, when the aerator cone 35 is operated the funnels 53 and the associated piping 55 will continuously conduct liquid from the aeration compartment 15 into the settling compartments 17 under sufficient pressure head to produce liquid flow in a downward direction within each of the settling compartments 17.

Figures 4, 5:
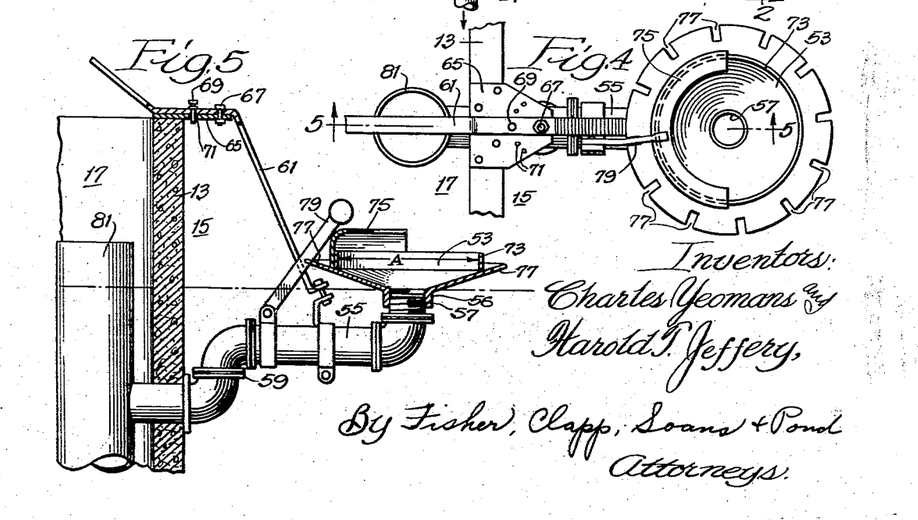
Figure 4 is a fragmentary plan view of one of the adjustable spray collecting funnels utilized in accomplishing the objects of the present invention.
Figure 5 is a sectional view taken on the line 5—5 of Figure 4.

For best results, the amount of liquid collected by each of the funnels 53 must be rather carefully controlled, and this control can be best accomplished by making the funnels 53 both vertically and horizontally adjustable. To this end, each of the funnels 53 has a threaded hub 56 (Figure 5) which engages the piping 55 through a threaded section 57 for permitting vertical adjustment, and each of the sets of piping 55 is provided with a swivel joint 59 and a pivotally supported combination adjusting handle and stay bar 61, whereby the funnels may be moved in arcuate horizontal paths such as are indicated by the lines 63 of Figure 1.

Each of the combined adjusting handle and stay bars 61 is supported upon plate members 65, which are rigidly attached to one of the baffles 13, through the agency of a suitable pivot connection 67, and each of the members 61 is provided with a locking pin 69 adapted to engage spaced adjusting holes 71 formed in the associated plate 65 for the purpose of locking the stay bar and the funnel connected thereto in any desired position.

In some instances, the vertical and horizontal adjustment for the funnels 53 just described will not provide sufficiently flexible control of the amount of liquor collected during the operation of the apparatus. For this reason, each of the funnels 53 is provided with an upstanding hollow cylindrical portion 73 and an inwardly curving, semi-circular cowling 75 which extends upwardly from this cylindrical portion. By turning the cowling 75 toward or away from the aerator cone disperser 35, very material variations in the amount of liquor collected by any particular funnel can readily be obtained. To facilitate the locking of the funnels 53 in place following the rotative adjustment of the cowling 75, the peripheral edge portion of each of the funnels 53 is notched as illustrated at 77 in Figure 4, and a pivoted locking member 79 supported upon the piping 55 is provided for cooperating with the locking notches 77. Rotation of the funnels 53 to accomplish adjustment of the cowling 75 may conveniently be carried out from the edge of the tank by the use of a hookstick or the like. For use in apparatus having a main tank about thirty feet square, the funnels 53 will have an effective diameter, the dimension A of Figure 5, of about 24 inches and will be located about two to four inches above the liquid level in the aeration compartment 15.

To minimize turbulence within the settling compartments 17 and to aid in securing proper downflow through those compartments, it is desirable that the inlet end of the piping 55 leading from each of the funnels 53 shall terminate in an open-ended, vertical pipe 81, the upper end of which is located above the liquid level in those compartments, and the other end of which extends about two-thirds to three-fourths of the distance to the bottom of each compartment. This pipe 81 or "loading well," as it is sometimes designated in the trade, may conveniently be supported upon two brackets 83, as illustrated in Figure 2.

The apparatus illustrated in Figures 1, 2 and 3 of the drawings is also provided with means for accomplishing continuous, automatic removal of sludge from the system and automatic return to the system of the liquor from which the sludge is removed. As will hereinafter appear, this sludge removal and liquid return apparatus operates on a principle which is very similar to the principle of operation of the improved combined aeration and settling tank described.

More particularly, the automatic sludge removal and liquid return apparatus of the present invention includes a rectangularly shaped sludge compartment or hopper 85 the walls of which may be formed integrally with the walls of the main tank 11. The sludge hopper 85 is provided with a sloping bottom 86 which slopes in all directions toward a sludge outflow pipe 87. A baffle 89 which terminates short of the hopper bottom divides the hopper 85 into two compartments. One of these compartments is connected to the aeration compartment 15 by means of a suitable pipe 91 which serves as the return for the liquor from which the sludge is separated. During the operation of the complete system, intermixed liquor and sludge are continuously conducted into the other compartment of the sludge hopper by means of suitable piping 93 and a funnel 53ª, which is exactly the same structurally as the funnels 53 previously described. A valve 95 is provided at the inner end of the piping 93 for permitting complete shut-off of the flow of liquid into the sludge removal apparatus.

The funnel 53ª is vertically adjustable similarly to the funnels 53 and includes the cowling 75 and the peripheral notches 77 which cooperate with one of the locking bars 79 for permitting convenient control of the amount of liquid collected by the funnel. The inlet end of the funnel 53ª is raised above the liquid level in the aeration compartment 15 about the same distance as the funnels 53, and when the aerator cone 35 is in operation, the funnel 53ª and its associated piping 93 will collect a predetermined, controllable amount of the intermixed sludge and sewage liquor and conduct this intermixed liquid into the sludge hopper 85. The sludge will settle out in the sludge hopper 85 and may be pumped away to the digester or other apparatus through the sludge outlet pipe 87.

Due to the fact that the liquid so conducted into the sludge hopper 85 is under a substantially greater pressure head than the main body of liquid in the aeration compartment 15, the supernatant liquor which rises in the sludge hopper 85 will be continuously returned automatically to the aeration compartment 15 through the sludge hopper outflow pipe 91. The return of this liquor will be facilitated somewhat if the outflow pipe is provided with an elbow 96 extending in the normal direction of rotative movement of the sludge and liquor in the aeration compartment, as illustrated in Figure 1.

Briefly summarizing the operation of the apparatus just described, raw liquid sewage will be continuously introduced at a predetermined slow rate of flow into the aeration compartment 15 through the influent pipe 29, where, by virtue of the action of the rotating aerator cone or disperser 35, it will be continuously intermixed with the sewage liquor and activated sludge contained in that compartment. Also, by virtue of the rotation of the aerator cone 35, the intermixed liquid contained in the aeration compartment 15 will be continuously thrown or scattered over the surface of the liquid contained in that compartment so as to accomplish effective, continuous aeration and intermixing of the sewage liquor and sludge. Continuously with this operation, predetermined amounts of the intermixed liquid spread over the surface of the aeration compartment 15 by the aerator cone 35 will be collected by the funnels 53 and thereby conducted into the settling compartments 17 under sufficient pressure head to cause continuous liquid flow downwardly through those compartments whereby the sludge which settles out in the settling compartments 17 will be continuously and automatically returned to the aeration chamber 15 through the restricted communicating openings formed by the pipes 21.

At the same time, the clear purified effluent which rises above the settled sludge in the settling compartments 17 will continuously be discharged into the effluent channel over the weirs 25. Also, sludge will be continuously removed from the aeration compartment 17 at whatever rate may be desired through the operation of the sludge removal apparatus, and by virtue of the fact that the intermixed sludge and liquor are introduced into the sludge removal hopper 85 under a substantially greater pressure head than that existing in the aeration chamber 15, automatic return of the supernatant liquor which rises above the settled sludge takes place automatically. The apparatus constitutes an extremely rugged, foolproof arrangement for use in the continuous treatment of sewage by the activated sludge method, and various practical experiments have demonstrated the correctness of the theories and principles embodied therein.

The foregoing principles of operation may be conveniently embodied into other types of sewage treatment apparatus. For example, in Figures 6 and 7 there is illustrated a combination aeration and settling tank apparatus which utilizes a cylindrical tank 97, preferably of cast, reinforced concrete. The bottom walls 99 of the tank 97 slope in all directions toward the center thereof, and an updraft tube 101, which may be exactly similar to the updraft tube 43 described in the foregoing, is supported in an upright position centrally of the tank by means of suitable brackets 103 and suitable guy stays 105. The lower or intake end of the updraft tube 101 is flared, as illustrated at 107, and is spaced above the bottom of the tank. A concrete beam 109 extends across the top of the tank 97 for the purpose of providing a walk, and also to provide a support for the cone type aerator apparatus 31ª which is exactly the same as the aerator apparatus 31 used in conjunction with the structure of Figures 1, 2 and 3.

In order to divide the main tank into an aeration and settling compartment, the apparatus includes an annularly shaped baffle 111 which may be formed of sheet metal and supported upon the bottom of the tank 97 in concentric relation therewith by suitable vertical and horizontal support members 112 and 113. The lower portion 114 of the baffle 111 slopes outwardly in the direction of the adjacent wall of the main tank 97 as illustrated in Figure 7 so as to restrict communication between the outer annular settling compartment 115 and the aeration compartment 119 to an annular passageway 121 of relatively narrow width.

The raw liquid sewage is continuously fed into the central aerator compartment 119 through a suitable inlet pipe 117, and during the operation of the apparatus a quantity of the intermixed sludge and sewage liquor contained in the aeration compartment 119 is continuously conducted into the settling tank 115 by means of four of the vertically and horizontally adjustable collecting funnels 53 used in conjunction with the apparatus of Figures 1, 2, and 3. These funnels 53 are supported upon the baffle 111 by means of piping 55 and a combination adjustable stay bar and operating handle support which is substantially identical with the corresponding parts of the square tank apparatus described in the foregoing. The piping 55 for each of the funnels 53 used in the circular tank structure also preferably terminates in loading wells 81 supported upon brackets 83 similarly to the square tank structure. This arrangement assures a continuous downflow of liquid within the annular settling compartment 115 which continuously returns the settled sludge to the central aeration compartment 119 through the restricted communicating opening 121 for recirculation through the aerator apparatus 31ª.

Figure 6:
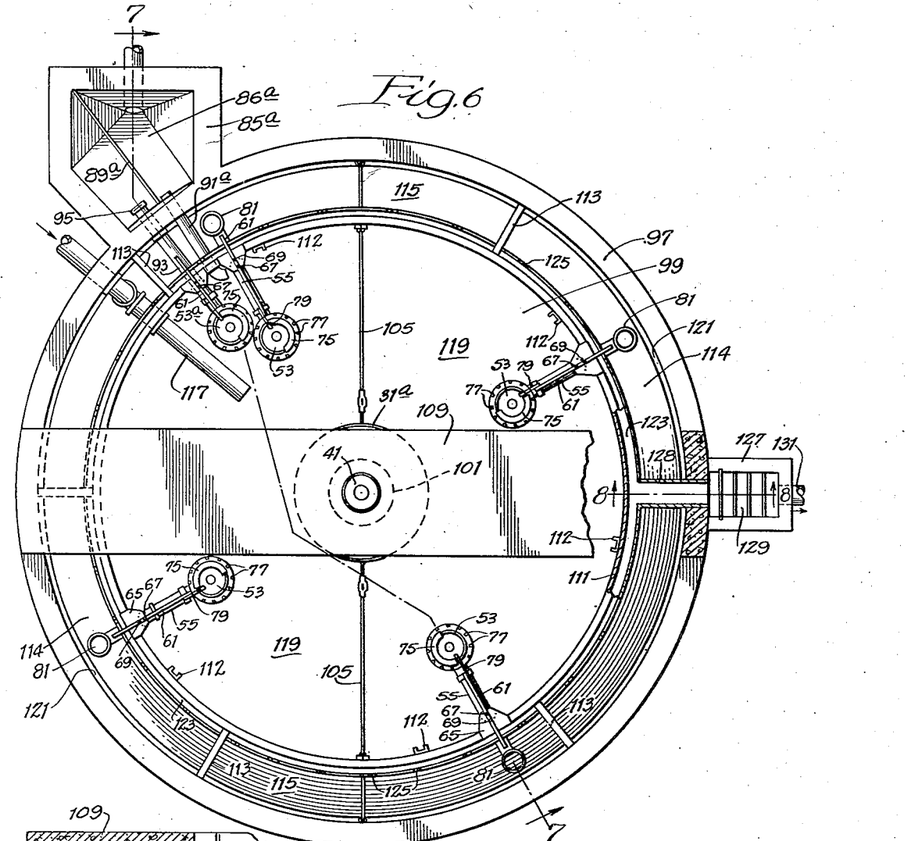
Figure 6 is a plan view of a second form of combination, areation and settling tank embodying the features of our invention.
Figure 7:
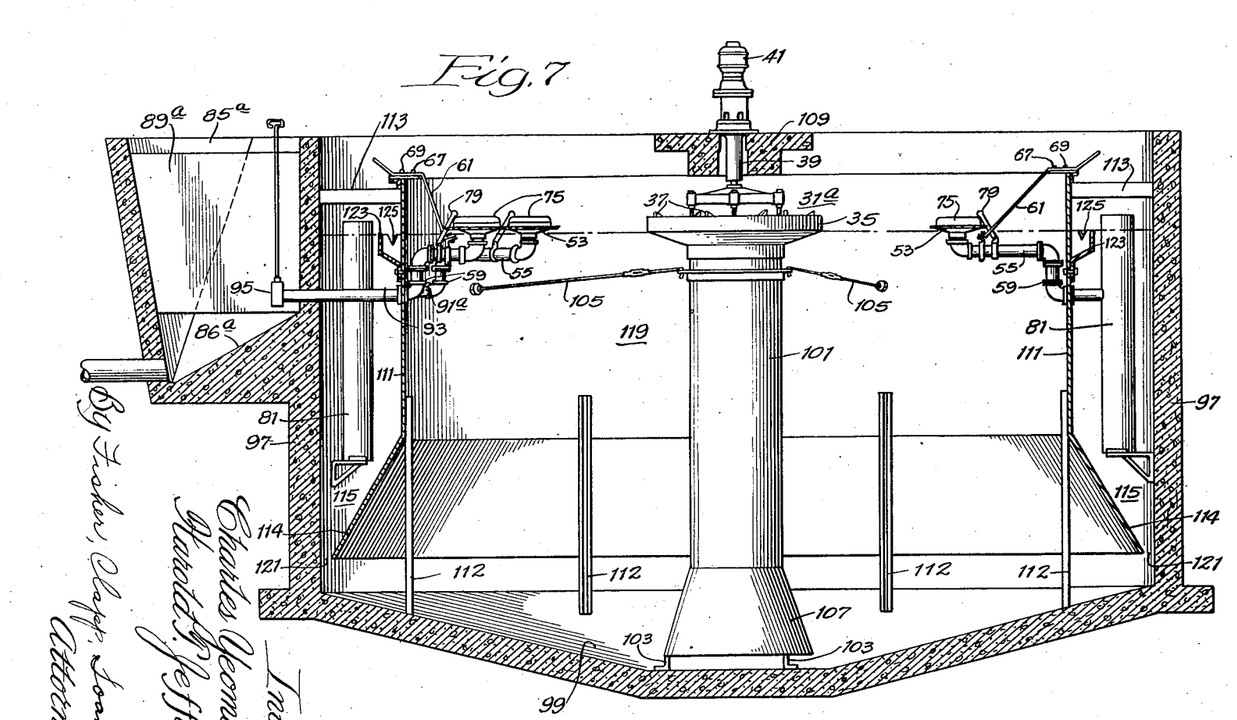
Figure 7 is a sectional view taken on the general line 7—7 of Figure 6.
Figure 8:
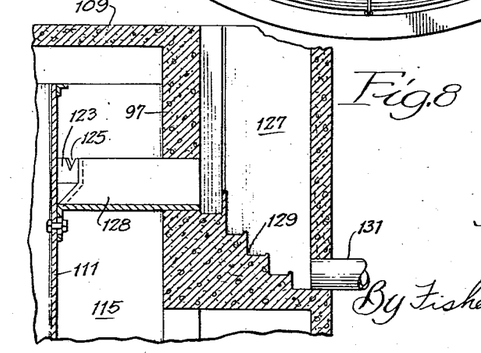
Figure 8 is an enlarged fragmentary sectional view taken on the line 8—8 of Figure 6.

The purified supernatant liquor or effluent which rises above the settling sludge in the annular settling compartment 115 is continuously carried away by means of an annularly shaped, box-like outflow channel or launder 123 which is vertically adjustably supported upon the outer wall of the baffle 111 separating the aeration and settling compartments as illustrated in Figures 6 and 7. This annularly shaped, box-like launder structure 123 is provided with a series of spaced V shaped slots 125 in its outer face for assuring even inflow of the effluent and communicates with an effluent outflow box 127 through a trough or pipe 128. The effluent box 127 is preferably of the cascade type, the features of which are well known in the art, and it is probably sufficient for the purpose of this application to point out that the device constitutes little more than a rectangular box-like chamber having a stepped bottom 129 which communicates with the main effluent outflow pipe 131, as illustrated particularly in Figure 8.

The circular tank apparatus illustrates in Figures 6 and 7 is also provided with an automatic sludge removing apparatus which, similarly to the structure of Figures 1, 2, and 3, includes a suitable sludge hopper 85ª having a sloping bottom 86ª and provided with a baffle 89ª for dividing the hopper into two compartments. During the operation of the apparatus, a funnel 53ª and piping 93 which are exactly similar to the funnel 53ª and piping 93 of the square tank apparatus continuously conduct a quantity of the intermixed sludge and liquor from the aeration compartment 119 into the sludge hopper 85ª under a substantially greater pressure head than that existing in the aeration compartment 119, and this pressure head forces the supernatant liquor which rises above the settling sludge back into the aeration compartment through the piping 91ª which corresponds to the piping 91 in the square tank apparatus.

The round tank apparatus operates in almost exactly the same manner as the previously described square tank apparatus. Raw sewage is continuously introduced into the aeration compartment 119 through the inflow pipe 117. In this compartment it is intermixed with the activated sludge and is aerated by the rotary disperser or cone aerating apparatus 31ª. Continuously with the aerating operation, predetermined amounts of the intermixed sludge and liquor are continuously conducted into the annular sludge settling compartment 115 under sufficient pressure head to produce a continuous flow downwardly through that compartment and back into the aeration compartment 119 through the restricted communicating opening 121. This flow causes continuous return of the sludge which settles out in the settling compartment 115 to the aeration compartment 119. At the same time, the clear purified effluent is continuously removed from the settling compartment by the launder 123 or equivalent means. Also, a predetermined amount of sludge is continuously removed from the apparatus by the improved sludge removing structure of our invention which also automatically effects continuous return of the liquor with which the sludge so removed was mixed.

Figure 9:
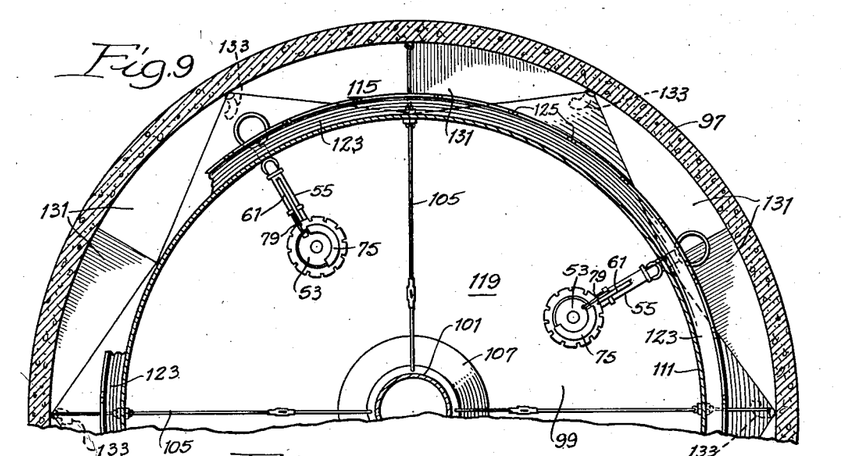
Figure 9 is a fragmentary sectional view, similar to Figure 6, illustrating a third form of the combination aeration and settling tank of our invention. The view is taken on the general line 9—9 of Figure 10.
Figure 10:
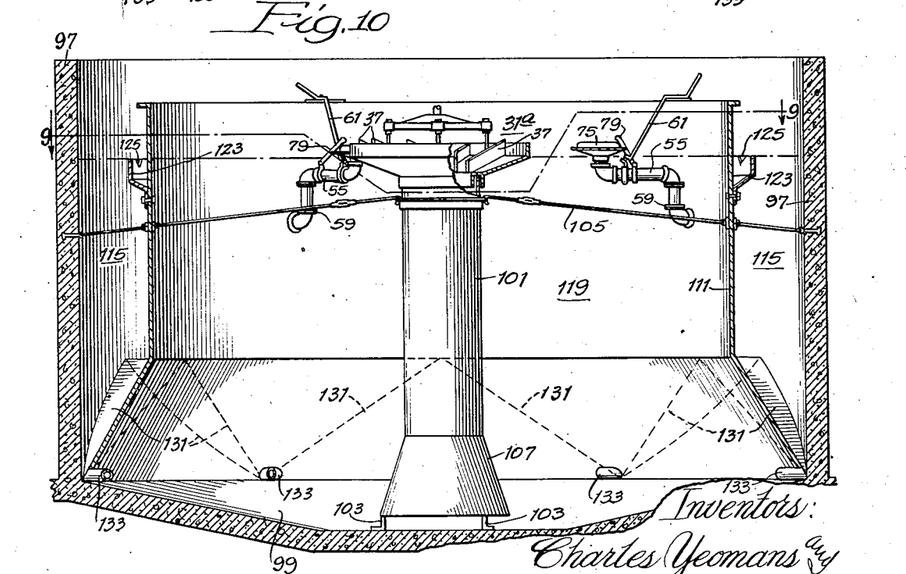
Figure 10 is another sectional view of the apparatus illustrated in Figure 9.

In Figures 9 and 10 we have illustrated a slight modification of the circular tank apparatus of Figures 6 and 7. The only important difference between the apparatus of Figures 9 and 10 and the apparatus of Figures 6 and 7 consists in a modification of the structure of the annular baffle 111 which divides the main tank into an aeration compartment 119 and a settling compartment 115. This baffle 111, in addition to terminating, as in the previously described structure, in an outwardly projecting, conical section 114, is provided with internally disposed baffles 131 which are of such form and so positioned that the bottom of the settling compartment 115 slopes toward a plurality of symmetrically positioned outlet pipes 133, the openings through which serve as the only connection between the settling and aeration compartments. This modified circular tank apparatus is somewhat more expensive to construct than the apparatus of Figures 6 and 7, but it has advantages in certain types of installations. The operation of the modified circular tank apparatus will be exactly the same as the operation of the apparatus in Figures 6 and 7, except that the sludge which settles out in the settling compartment 115 will be returned to the aeration compartment 119 through the spaced openings provided by the pipes 133 instead of through the annular opening 121.

From the foregoing it will be seen that we have provided improved apparatus for continuously separating sludge from sewage liquor during the treatment of sewage by the activated sludge method. Our invention includes a novel principle of operation for sewage treatment apparatus utilizing combination settling and aeration tanks, namely the provision of means for continuously introducing intermixed sludge and liquid from the aeration tank into the settling tank under a sufficient pressure head to produce a downflow within the settling tank which can be used for moving the sludge back into the aeration tank through a restricted communicating opening. We have also disclosed how this principle of automatically removing intermixed sludge and liquor from an aeration compartment under pressure may be utilized for accomplishing automatic removal of sludge from the sewage treatment apparatus while at the same time assuring automatic return to the system of the liquid with which the sludge has been intermixed. In addition, we have disclosed certain novel apparatus particularly suitable for carrying out the novel operational principles of our invention.

It will be understood that various types of apparatus may be developed for carrying out the principles which we have set forth in the foregoing. For this reason, it is our desire that the accompanying claims shall be accorded the broadest reasonable construction consistent with the language appearing therein and the prior art.

We claim the following as our invention:

1. In apparatus for the treatment of liquid sewage by the use of activated sludge, means defining the walls of at least two separate compartments, one of said compartments constituting a settling compartment and having an outlet for clarified effluent, the other of said compartments constituting an aeration compartment and having an inlet for raw sewage, said settling compartment communicating with said aeration compartment through a restricted opening located adjacent the bottom of said settling compartment, and the bottom of said settling compartment sloping in all directions toward said restricted opening, aerator means operable to raise liquid from said aeration compartment and to scatter this liquid in the form of a spray over the surface of the liquid contained in said aeration compartment to thereby aerate and intermix the same, driving means for said aerator means connected in driving relationship therewith, means including a funnel supported within said aeration compartment with the inlet end thereof located above the liquid level in that compartment for collecting a portion of the liquid scattered over the surface of said aeration tank by said aerating means and for conducting the liquid so collected into said settling chamber under sufficient pressure head to produce continuous flow from said settling compartment into said aeration compartment through said restricted opening, means providing for vertical adjustment of said funnel, means providing for horizontal adjustment of said funnel, the vertical and horizontal adjustment of said funnel serving to regulate the amount of liquid collected by said funnel and to regulate said pressure head producing continuous flow, and means for discharging sludge from said apparatus during the operation thereof.

2. In apparatus for accomplishing the automatic removal of sludge and the automatic return to the apparatus of the liquor with which such sludge is mixed during the treatment of liquid sewage by the activated sludge process, aeration and settling tanks having an inlet for raw sewage and an outlet for clarified effluent, a sludge collecting tank which communicates with said aeration tank through a passageway provided in the walls of said sludge collecting tank, aerator means operable to raise the liquor and sludge contained in said aeration tank and to scatter this liquid in the form of a thin film over the surface of the liquid in said aeration tank to thereby aerate and intermix the same, driving means for said aerator means connected in driving relationship therewith, means including a funnel which is positioned within said aeration tank with the inlet end thereof above the liquid level in that tank and with the outlet in communication with said sludge collecting tank for collecting a portion of the intermixed liquid and sludge scattered over the surface of said aeration tank by said aerating means and for conducting the mixture so collected into said sludge collecting tank under sufficient pressure head to produce a slow, continuous flow of liquor from said sludge collecting tank back into said aeration tank through said communicating passageway, and means for discharging sludge from said sludge collecting tank during the operation of said apparatus.

3. In apparatus for the treatment of liquid sewage by the use of activated sludge, means defining the walls of an aeration compartment having an inlet for raw sewage, a settling compartment having an outlet for clarified effluent, and a sludge collecting compartment having a sludge discharge outlet, said settling compartment communicating with said aeration compartment through a restricted opening located adjacent the bottom of said settling compartment and the bottom of said settling compartment sloping in all directions toward said restricted opening, said sludge collecting compartment communicating with said aeration compartment through a passageway provided in the walls of said sludge collecting compartment, aerator means operable to raise the sludge and liquor contained in said aeration tank and to scatter this liquid in the form of a spray over the surface of the liquid in said aeration compartment to thereby aerate and intermix the same, driving means for said aerator means connected in driving relationship therewith, and means including at least two funnels positioned within said aeration compartment with the inlet ends thereof located above the liquid level in that compartment for continuously collecting a portion of the intermixed sludge and liquor scattered over the surface of said aeration tank by said aerating means, piping connecting the outlet end of one of said funnels to said settling compartment, the head provided by the elevation of said one funnel above the liquid level in said aeration compartment being sufficient to produce a flow of liquid which moves the settled sludge from said settling compartment into said aeration compartment through the restricted opening connecting those compartments, and other piping for connecting the outlet end of the other funnel to said sludge removal compartment, the head provided by the elevation of said other funnel above the liquid level in said aerator compartment causing the supernatant liquor in said sludge removal compartment to flow back into said aeration chamber through said communicating passageway.

4. In apparatus for the treatment of liquid sewage by the use of activated sludge, a sewage tank, partition means dividing said sewage tank into at least two separate compartments, one of said compartments constituting a settling compartment and having an outlet for clarified effluent, the other of said compartments constituting an aeration compartment and having an inlet for raw sewage, said settling compartment communicating with said aeration compartment through a restricted opening located adjacent the bottom of said settling compartment, and the bottom of said settling compartment sloping in all directions toward said restricted opening, the bottom of said aeration compartment sloping toward the center thereof, aerator means including a centrally disposed uptake tube and a rotary disperser for drawing the intermixed liquor and sludge from the bottom of said aeration compartment and for scattering this intermixed liquid over the surface of the liquid contained in said aeration compartment to thereby aerate and further intermix the same, driving means for said aerator means connected in driving relationship with said rotary disperser, means including a funnel which is positioned within said aeration compartment with the inlet end thereof located above the liquid level in said aeration compartment for collecting a portion of the intermixed sludge and liquor scattered over the surface of said aeration tank by said aerating means and for conducting the liquid so collected into said settling chamber under sufficient pressure head to produce continuous flow from said settling compartment into said aeration compartment through said restricted opening, means providing for vertical adjustment of said funnel, means providing for horizontal adjustment of said funnel, the vertical and horizontal adjustment of said funnel serving to regulate the amount of liquid collected by said funnel and to regulate said pressure head producing continuous flow, and means for discharging sludge from said apparatus during the operation thereof.

5. In apparatus for the treatment of liquid sewage by the use of activated sludge, a rectangular sewage tank having a sloping bottom, a raw sewage inlet, and an outlet for clarified effluent, partitions located in the corners of said tank for defining a plurality of triangularly shaped settling compartments, the central portion of said sewage tank constituting an aeration compartment, each of said settling compartments communicating with said central aeration compartment through a restricted opening located adjacent the bottom of that compartment and the bottom of each of said settling compartments sloping in all directions toward said restricted opening, aerator means including a centrally disposed uptake tube and a rotary disperser for drawing the intermixed liquid and sludge from the bottom of said aeration compartment and for scattering this intermixed liquid over the surface of the liquid contained in said aeration compartment to thereby aerate the same, driving means for said aerator means connected in driving relationship with said rotary disperser, means including a plurality of funnels positioned within said aeration compartment with the inlet ends thereof located above the liquid level in that compartment for collecting a portion of the liquid scattered over the surface of said central compartment by said aerating means and for conducting liquid so collected into said settling chamber under sufficient pressure head to produce a slow, continuous flow from each of said settling compartments into said central compartment through said restricted openings, means providing for vertical adjustment of said funnels, means providing for horizontal adjustment of said funnels, the vertical and horizontal adjustment of said funnels serving to regulate the amount of intermixed sludge and liquor collected by said funnels and to regulate the pressure head producing said continuous flow, and means for discharging sludge from said apparatus during the operation thereof.

6. In apparatus for the treatment of liquid sewage by the use of activated sludge, a circular sewage tank having a raw sewage inlet and an outlet for clarified effluent, an annularly shaped baffle disposed centrally within said tank for dividing said tank into an inner aeration compartment and an outer, annularly shaped settling compartment, said settling compartment communicating with said aeration compartment through a restricted, annularly shaped passageway located at the bottom of said settling compartment and the walls of said settling compartment sloping in all directions toward said annular opening, aerator means including a centrally disposed uptake tube and a rotary disperser for raising the intermixed liquor and sludge contained in said aeration compartment and for scattering this liquid over the surface of the liquid contained in said aeration compartment to thereby aerate the same, driving means for said aerator, means connected in driving relationship with said rotary disperser, means including at least one funnel member which is positioned within said aeration compartment with the inlet end thereof located above the liquid level in that compartment for collecting a portion of the intermixed liquor and sludge scattered over the surface of said aeration compartment by said aerating means and for conducting the intermixed liquor and sludge so collected into said settling compartment under sufficient pressure head to produce a slow continuous flow from said settling compartment into said aeration compartment through said annular opening, and means for discharging sludge from said apparatus during the operation thereof.

7. In apparatus for the treatment of liquid sewage by the use of activated sludge, a circular sewage tank having a raw sewage inlet and an outlet for clarified effluent, an annularly shaped baffle disposed centrally within said tank for dividing said tank into an inner aeration compartment and an outer, annularly shaped settling compartment, said settling compartment communicating with said aeration compartment through a restricted, annularly shaped passageway located at the bottom of said settling compartment and the walls of said settling compartment sloping in all directions toward said restricted opening, means defining the walls of a sludge collecting compartment which communicates with said aeration compartment through a passageway provided in the walls of said sludge collecting compartment, aerator means operable to raise the sludge and liquor contained in said aeration compartment and to scatter this liquid over the surface of the liquid contained in said aeration compartment to thereby aerate the same, driving means for said aerator means connected in driving relationship therewith, and means including at least two funnels positioned within said aeration compartment with the inlet ends thereof located above the liquid level in that compartment for continuously collecting a portion of the intermixed sludge and liquor scattered over the surface of said aeration compartment by said aerator means, piping connecting the outlet end of one of said funnels to said settling compartment, the head provided by the elevation of said one funnel above the liquid level in said aerator compartment being sufficient to produce a flow of liquid which moves the settled sludge from said settling compartment into said aeration compartment through the restricted annular opening connecting those compartments, and other piping for connecting the outlet end of the other funnel to said sludge collecting chamber, the head provided by the elevation of said other funnel above the liquid level in said aerator compartment causing the supernatant liquor in said sludge collecting chamber to flow back into said aeration chamber through said communicating passageway.

8. In apparatus for the treatment of liquid sewage by the use of activated sludge, a circular sewage tank having a raw sewage inlet and an outlet for clarified effluent, an annularly shaped baffle disposed centrally within said tank for dividing said tank into an aeration compartment and an outer, annularly shaped settling compartment, said settling compartment communicating with said aeration compartment through a plurality of spaced, restricted openings located at the bottom of said settling compartment, the walls of said settling compartment sloping toward said communicating openings, aerator means operable to raise the sludge and liquor contained in said aeration compartment and to scatter this liquid in the form of a spray over the surface of the liquid in said aeration compartment to thereby aerate and intermix the same, driving means for said aerator means connected in driving relationship therewith, means including at least one funnel member which is positioned within said aeration compartment with the inlet end thereof located above the liquid level in that compartment for collecting a portion of the intermixed liquor and sludge scattered over the surface of said aeration compartment by said aerator means and for conducting the intermixed liquor and sludge so collected into said settling compartment under sufficient pressure head to produce a slow, continuous flow from said settling compartment into said aeration compartment through said spaced openings, and means for discharging sludge from said apparatus during the operation thereof.

9. In combination, a liquid collecting funnel particularly suitable for use in apparatus of the class described and comprising a cylindrical hub portion, a conical body portion, the outer periphery of which is provided with spaced slots, an upstanding hollow cylindrical portion located inside said slotted peripheral portion, and an inwardly curving cowling integrally attached to and extending upwardly from at least a substantial portion of said cylindrical portion, a rotatable support for said funnel, and a locking member movable into and out of engagement with said slots to lock said funnel in position during the use thereof.

CHARLES YEOMANS.
HAROLD T. JEFFERY.